US011792079B2

(12) United States Patent
McPherson

(10) Patent No.: US 11,792,079 B2
(45) Date of Patent: *Oct. 17, 2023

(54) DNS PACKAGE IN A NETWORK

(71) Applicant: VERISIGN, INC., Reston, VA (US)

(72) Inventor: Danny McPherson, Leesburg, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,221

(22) Filed: Jan. 24, 2020

(65) Prior Publication Data

US 2020/0162334 A1 May 21, 2020

Related U.S. Application Data

(63) Continuation of application No. 15/901,685, filed on Feb. 21, 2018, now Pat. No. 10,560,339, which is a
(Continued)

(51) Int. Cl.
*H04L 61/4511* (2022.01)
*H04L 41/12* (2022.01)
(Continued)

(52) U.S. Cl.
CPC .............. *H04L 41/12* (2013.01); *H04L 41/50* (2013.01); *H04L 61/4511* (2022.05);
(Continued)

(58) Field of Classification Search
CPC ....... H04L 41/12; H04L 41/50; H04L 63/168; H04L 61/1511; H04L 63/0823; H04L 61/1552
See application file for complete search history.

(56) References Cited

U.S. PATENT DOCUMENTS 2,611,113 A 9/1952 Cade
6,304,973 B1 10/2001 Williams
(Continued)

FOREIGN PATENT DOCUMENTS

CA 2686142 A1 * 5/2011 .......... H04L 61/1511
EP 2611113 B1 8/2017
WO WO-2009047784 A2 * 4/2009 ......... G06Q 30/0239

OTHER PUBLICATIONS

Chris Sanders, "Editing the DNS Root Hints Files", Sep. 17, 2007, obtained online from <https://techgenix.com/dnsroothints/>, retrieved on Aug. 28, 2021 (Year: 2007).*
(Continued)

*Primary Examiner* — Farid Homayounmehr
*Assistant Examiner* — Zhimei Zhu
(74) *Attorney, Agent, or Firm* — McCarter & English, LLP; Michael A. Sartori

(57) ABSTRACT

A Domain Name System ("DNS") package, a non-transitory computer-readable medium, and a method for providing domain name resolution services are disclosed. The system can include one or more built-in DNS hierarchy databases configured for deployment within a network, wherein the one or more built-in DNS hierarchy databases stores DNS records. The system can also include a recursive name server, wherein the recursive name server is configured to query the one or more built-in DNS hierarchy databases during domain name resolution, the recursive name server configured to select the one or more built-in DNS hierarchy databases based on a policy indicating a preference for the one or more built-in DNS hierarchy databases over a domain name server located outside of the network. Furthermore, the system can include a recursive name server database configured to store DNS records for the recursive name server.

20 Claims, 6 Drawing Sheets

Related U.S. Application Data continuation of application No. 14/524,644, filed on Oct. 27, 2014, now Pat. No. 9,912,543, which is a continuation of application No. 13/341,032, filed on Dec. 30, 2011, now Pat. No. 8,874,790.

(51) Int. Cl.
  *H04L 9/40* (2022.01)
  *H04L 41/50* (2022.01)
  *H04L 61/4552* (2022.01)

(52) U.S. Cl.
  CPC ........ *H04L 63/0823* (2013.01); *H04L 63/168* (2013.01); *H04L 61/4552* (2022.05)

(56) References Cited

U.S. PATENT DOCUMENTS

| | | |
|---|---|---|
| 6,834,302 B1 | 12/2004 | Harvell |
| 6,895,430 B1 | 5/2005 | Schneider |
| 6,901,436 B1 | 5/2005 | Schneider |
| 6,973,505 B1 | 12/2005 | Schneider |
| 7,188,138 B1 | 3/2007 | Schneider |
| 7,194,552 B1 | 3/2007 | Schneider |
| 7,441,045 B2 | 10/2008 | Skene et al. |
| 7,478,148 B2 | 1/2009 | Neerdaels |
| 7,565,402 B2 | 7/2009 | Schneider |
| 7,808,987 B2 | 10/2010 | Bauer et al. |
| 8,037,168 B2 | 10/2011 | Schneider |
| 8,108,507 B2 | 1/2012 | Weller et al. |
| 8,214,691 B1 | 7/2012 | Spalink et al. |
| 8,224,994 B1 | 7/2012 | Schneider |
| RE43,690 E | 9/2012 | Schneider et al. |
| RE44,207 E | 5/2013 | Schneider |
| 8,458,161 B2 | 6/2013 | Schneider |
| 8,612,565 B2 | 12/2013 | Schneider |
| 8,635,340 B1 | 1/2014 | Schneider |
| 8,874,790 B2 | 10/2014 | McPherson |
| 2004/0210672 A1* | 10/2004 | Pulleyn ............... H04L 61/1511 709/245 |
| 2005/0102354 A1 | 5/2005 | Hollenbeck et al. |
| 2006/0074618 A1* | 4/2006 | Miller ................. G06F 11/3664 703/13 |
| 2007/0140239 A1 | 6/2007 | Bauer et al. |
| 2007/0294419 A1* | 12/2007 | Ulevitch ............. H04L 61/4511 709/230 |
| 2008/0016233 A1 | 1/2008 | Schneider |
| 2008/0059607 A1 | 3/2008 | Schneider |
| 2009/0019143 A1 | 1/2009 | Frutiger |
| 2010/0257024 A1* | 10/2010 | Holmes .............. G06Q 30/0282 709/245 |
| 2011/0219067 A1 | 9/2011 | Bernosky et al. |
| 2012/0054266 A1 | 3/2012 | Kazerani et al. |
| 2012/0102109 A1 | 4/2012 | Eberhard |
| 2012/0173684 A1 | 7/2012 | Courtney et al. |
| 2012/0173760 A1 | 7/2012 | Jog et al. |
| 2012/0203904 A1* | 8/2012 | Niemela ............. H04L 61/1511 709/225 |
| 2013/0024503 A1 | 1/2013 | Neerdaels |
| 2013/0111049 A1 | 5/2013 | Abu-Amara et al. |
| 2015/0046577 A1 | 2/2015 | McPherson |

OTHER PUBLICATIONS

S. Krishnaswamy, "Split-View DNSSEC Operational Practices", Mar. 4, 2007, DNS Operations, Internet-Draft, obtained online from <https://datatracker.ietf.org/doc/html/draft-krishnaswamy-dnsop-dnssec-split-view-04>, retrieved on Feb. 23, 2022 (Year: 2007).*

Matt Lavinder, "Why are clients not using preferred DNS Server?", Oct. 18, 2011, obtained online from <https://social.technet.microsoft.com/Forums/en-US/1f11581b-e09b-40c4-8d99-f7270ae843c0/why-are-clients-not-using-preferred-dns-server?forum=winserverNIS>, retrieved on Feb. 23, 2022 (Year: 2011).*

Barrett et al., "DNS and email issues in connecting UNINET-ZA to the Internet", Nov. 2011, provided in the IDS dated Jan. 24, 2020 (Year: 2011).*

Jianping Pan, Y.Thomas Hou, Bo Li, "An overview of DNS-based server selections in content distribution networks", Computer Networks, vol. 43, Issue 6, (Year: 2003).*

Extended European Search Report dated Apr. 4, 2013, European Application No. EP 12197270, filed Dec. 14, 2012, pp. 1-5, published by the European Patent Office.

A. Barrett, "DNS and email issues in connecting UNINET-ZA to the Internet", Nov. 24, 2011, pp. 1-7. http://www.ru.ac.za/media/rhodesuniversity/content/informationtechnology/documents/generaldocumentrespoitory/uninet-dns-mail.pdf, accessed Mar. 19, 2013.

W.C.A. Wijngaards, "Unbound:HowtoTurn Off DNSEEC", Jun. 2010, p. 1. http://unbound.net/documentation/howtoturnoff_dnssec.html, accessed Mar. 21, 2013.

Ohta, "Root Name Servers with Inter Domain Anycast Addresses," Feb. 2004, [online] Retrieved on Oct, 7, 2013, Retrieved from <URL://tools.ietf.org/html/draft-ietf-dnsop-ohta-shared-root-server>.

"Planning Your Secure DNS Deployment", Oct. 7, 2009, Retrieved from the Internet: <URL:http//web.archive org/web/20111017181003/http://technet.microsoft.com/en-us/library/ee-649237(v=WS.10).aspx>, retrieved on Jun. 13, 2014.

"The Domain Name System", Jun. 16, 2007, Retrieved from the Internet: <URL:http://web.archive.org/web/20070616122936/http://www.netbsd.org/docs/guide/en/chap-dns.html>, retrieved on Jun. 13, 2014.

"New gTLD Program: Draft Applicant Guidebook (Draft RFP)", Oct. 24, 2008, The Internet Corporation for Assigned Names and Numbers (ICANN), p. 1-12.

Vixie et al., "Dynamic Updates in the Domain Name System (DNS Update)", Apr. 1997, Network Working Group Request for Comments: 2136, obtained online <http://tools.ietf.org.pdf/rfc2136.pdf> on Apr. 22, 2013, pp. 1 and 2.

Arends et al., "Protocol Modifications for the DNS Security Extensions", Mar. 2005, Network Working Group Request for Comments: 4035, obtained online <http://tools.ietf.org.pdf/rfc4035.pdf> on Apr. 22, 2013.

"Securing the Root: What is DNSSEC, what's the controversy", In IGP blog (Internet Governance Project Blog) [online], Apr. 2007: [retrieved on Apr. 23, 2013], Retrieved from the internet: <URL:http://www.internetgovemance.org/2007/04/09/securing-the-root-what-is-dnssec-whats-the-controversy/>.

* cited by examiner

DNS PACKAGE IN A NETWORK

CROSS REFERENCED TO RELATED APPLICATION

This application is a continuation of U.S. patent application Ser. No. 15/901,685, filed on Feb. 21, 2018, which is a continuation of U.S. patent application Ser. No. 14/524,644 filed on Oct. 27, 2014, which is a continuation of U.S. patent application Ser. No. 13/341,032 filed on Dec. 30, 2011, now U.S. Pat. No. 8,874,790 issued on Oct. 28, 2014, all of which are hereby incorporated by reference in their entirety.

TECHNICAL FIELD

The present disclosure relates to the Domain Name System ("DNS"). More particularly, the present disclosure relates to a DNS package and a method for providing domain name resolution services in a network.

BACKGROUND

The Domain Name System ("DNS") is a hierarchical naming system for devices connected to the Internet and is built on databases distributed across a plurality of DNS servers. Its primary purpose is to translate user-friendly domain names to the Internet Protocol ("IP") addresses used by devices connected to the Internet. When a DNS request (also known as a "DNS query") is made for a domain name, such as when a user types in a URL address to find a specific Internet site, the request reaches the top level of servers that form the DNS and travels down the hierarchical system of servers until the IP address corresponding to the domain name is located. If an entry for the requested domain name is found, a DNS reply is issued containing the appropriate IP address to the requestor.

The DNS servers storing domain name databases are deployed worldwide but located in a finite number of locations. Therefore, in a particular network having a confined network boundary, such as a national network in a geographical national boundary, a corporate network in a logical corporation boundary, or a network operated by an Internet service provider ("ISP"), a user may have to make necessary DNS queries to DNS servers outside the network boundary to resolve a domain name, even if the device corresponding to the domain name may be itself within the network boundary. When the network is temporarily or permanently partitioned or isolated from the global Internet, users of the network may be unable to even access websites hosted within the network boundary because domain name resolution would be interrupted due to the failure to access one or more DNS servers located outside of network boundary.

Therefore, it may be desirable to have a DNS package capable of self-sufficiently operating within a network to provide domain name resolution services in the event of network partition or isolation.

SUMMARY

In one embodiment, a Domain Name System ("DNS") hardware package for providing domain name resolution services can include one or more built-in DNS hierarchy databases configured for deployment within a network, wherein the one or more built-in DNS hierarchy databases stores DNS records for one or more of a root domain, a top-level domain ("TLD"), or a second-level domain ("SLD"). The DNS hardware package can also include a recursive name server, wherein the recursive name server is configured to query the one or more built-in DNS hierarchy databases during domain name resolution. In some examples, the recursive name server can be configured to select the one or more built-in DNS hierarchy databases based on a policy indicating a preference for the one or more built-in DNS hierarchy databases over a domain name server located outside of the network. The DNS hardware package can also include a recursive name server database configured to store DNS records for the recursive name server, wherein the one or more built-in DNS hierarchy databases, the recursive name server, and the recursive name server database are configured for deployment in the network.

In some examples, the DNS hardware package can include internally linking related DNS records in the top-level domain and the second-level domain in the one or more built-in DNS hierarchy databases. In some embodiments, the recursive name server is configured for DNS caching, the DNS caching comprising storing DNS query results for a period of time. In some examples, the recursive name server is configured to determine the period of time based on a time-to-live value determined during configuration of the DNS records.

In some embodiments, the one or more built-in DNS hierarchy databases are configured to provide a network address corresponding to one of the DNS records for the top-level domain in response to a domain name resolution query from the recursive name server. In some examples, the recursive name server is configured to block, redirect, wildcard, synthesize, or geo-locate an address associated with a domain name resolution request. In some embodiments, the recursive name server is configured to disregard an expired DNSSEC certificate. In some examples, the recursive name server is configured to bypass DNSSEC certificate validation.

In some embodiments, a response received by the recursive name server is validated based on a Domain Name System Security Extensions ("DNSSEC") certificate, wherein the recursive name server is configured to perform domain name resolution even when the DNSSEC certificate expires. In some examples, the DNS hardware package can include a registry server configured to store a copy of at least a portion of top level domain data corresponding to a managed top level domain.

In some embodiments, a method for providing domain name resolution services can include storing DNS records for one or more of a root domain, a top-level domain ("TLD"), or a second-level domain ("SLD"), the DNS records being stored with one or more built-in DNS hierarchy databases configured for deployment within a network. The method can also include querying, using a recursive name server, the one or more built-in DNS hierarchy databases during domain name resolution, the recursive name server selecting the one or more built-in DNS hierarchy databases based on a policy indicating a preference for the one or more built-in DNS hierarchy databases over a domain name server located outside of the network. In some examples, the method can include storing, using a recursive name server database, DNS records for the recursive name server, wherein the one or more built-in DNS hierarchy databases, the recursive name server, and the recursive name server database are deployed in the network.

In some embodiments, a non-transitory computer-readable medium for providing domain name resolution services can include a plurality of instructions that, in response to execution by a processor, cause the processor to perform operations including storing DNS records for one or more of a root domain, a top-level domain ("TLD"), or a second-level domain ("SLD"), the DNS records being stored with one or more built-in DNS hierarchy databases configured for deployment within a network. The operations can also include querying, using a recursive name server, the one or more built-in DNS hierarchy databases during domain name resolution, the recursive name server selecting the one or more built-in DNS hierarchy databases based on a policy indicating a preference for the one or more built-in DNS hierarchy databases over a domain name server located outside of the network. Furthermore, the operations can include storing, using a recursive name server database, DNS records for the recursive name server, wherein the one or more built-in DNS hierarchy databases, the recursive name server, and the recursive name server database are deployed in the network.

The preceding summary and the following detailed description are exemplary only and do not limit the scope of the claims.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings.

DESCRIPTION OF EXEMPLARY EMBODIMENTS

Reference will now be made in detail to exemplary embodiments, examples of which are illustrated in the accompanying drawings. When appropriate, the same reference numbers are used throughout the drawings to refer to the same or like parts.

Figure 1:
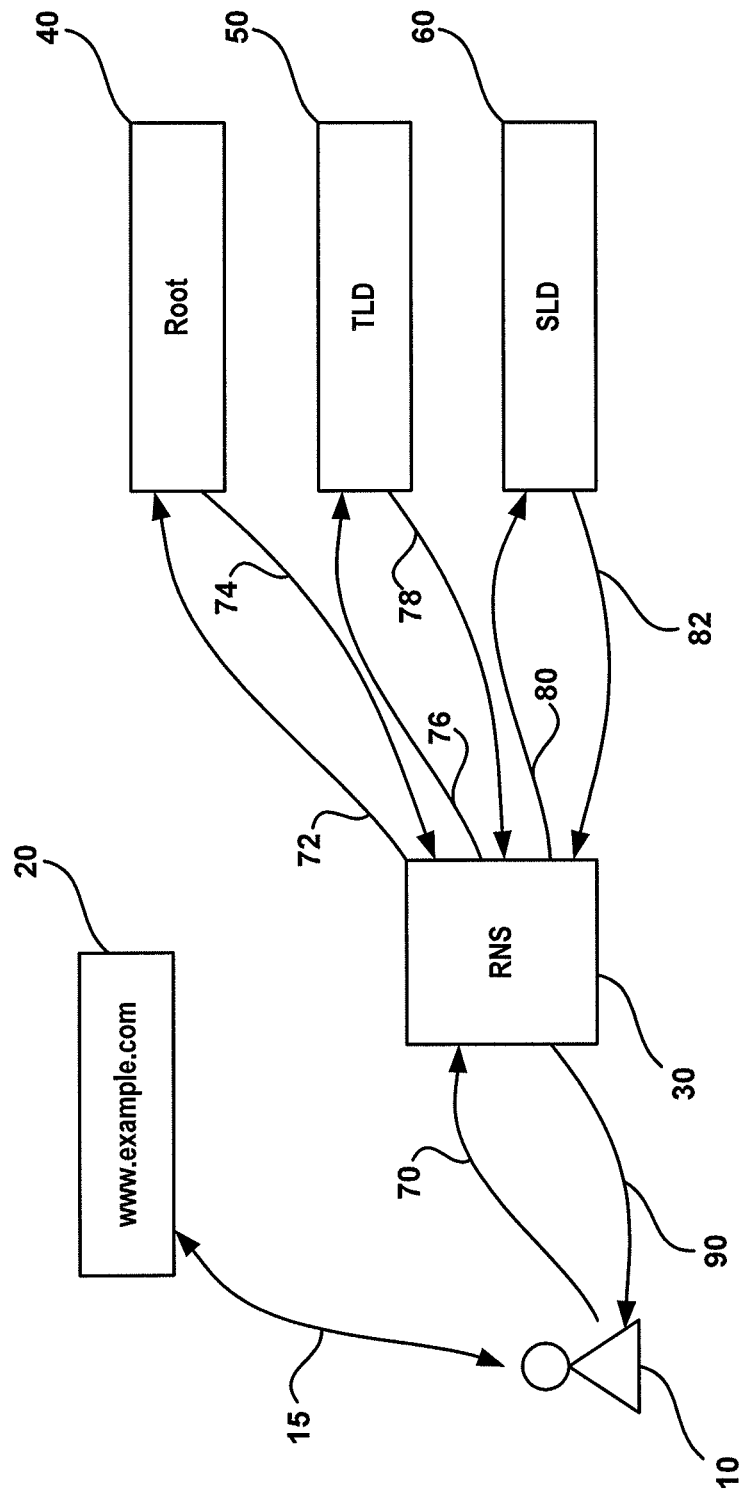
FIG. 1 is a schematic diagram illustrating an exemplary DNS system.

FIG. 1 illustrates an exemplary DNS system. In FIG. 1, a user 10 intends to access a website 20 having a human-readable domain name: "www.example.com." In order to locate website 20, the domain name has to be translated to machine-usable numbers, such as IP address 192.168.100.1, by the DNS system. The DNS system includes a recursive name server ("RNS") 30, a root name server 40, a top level domain ("TLD") name server 50, and a secondary level domain ("SLD") name server 60. Root name server (or "root") 40 is a name server for the DNS system's root zone, the top of the DNS hierarchy. Root 40 directly answers requests for records in the root zone and answers other requests by returning a list of the designated authoritative name servers for the appropriate TLD. TLD name server (or "TLD server") 50 is a name server for a TLD. A TLD is one of the domains at the highest level in the DNS hierarchy. TLD names are installed in the root zone of the name space. For all domains in lower levels, it is the last part of the domain name, that is, the last label of a fully qualified domain name. For example, in the domain name www.example.com, the top level domain is .com (or .COM, as domain names are not case-sensitive). SLD name server (or "SLD server") 60 is a name server for domains lower than a TLD. An SLD name server may be an authoritative name server. An authoritative name server is a name server that gives answers that have been configured by an original source, for example, the domain administrator or by dynamic DNS methods, in contrast to answers that were obtained via a regular DNS query to another name server. RNS 30 is a name server that implements a recursive algorithm necessary to resolve a given name starting with the root through to the authoritative name servers (e.g., in SLD) of the queried domain. RNS 30 may also support DNS caching which stores DNS query results for a period of time determined in the configuration (e.g., time-to-live) of the domain name record in question. RNS 30 may be provided by an Internet service provider ("ISP"), a government, a corporation, etc.

Referring to FIG. 1, user 10 provides the domain name www.example.com to a user application (e.g., a web browser, not shown) and the user application may first check local cache to determine if there is any record including IP address corresponding to the domain name. If not, the user application sends a DNS query to RNS 30, through an information path (or "path") 70. Alternatively, the user application may send the DNS query to RNS 30 without checking local cache. RNS 30, after receiving the DNS query, may check its cache first to determine if there is any record matching the query, provided that RNS 30 implements caching functionality. If not, RNS 30 sends the query to root 40, through path 72. Alternatively, RNS 30 may directly relay the query to root 40, if caching is not implemented. It is noted that there are more than one root servers in the DNS, and RNS 30 may randomly select one root server to send the query. Root 40 may respond to the query with a list of TLD server addresses, through path 74. For example, root 40 may return an IP address of TLD server 50 in the ".com" TLD. RNS 30 may then send the query to TLD server 50 through path 76 according to the address returned by root 40. TLD server 50 may in turn respond to the query by returning a list of authoritative server addresses in SLD, through path 78. For example, TLD server 50 may return an IP address of SLD server 60 corresponding to SLD "example.com" to RNS 30. RNS 30 then sends the query to SLD server 60, through path 80, according to the address obtained from TLD server 50. If SLD server 60 locates the IP address corresponding to www.example.com in its database, SLD server 60 will return the IP address to RNS 30 through path 82, thus completing the recursive process. RNS 30 will then send the resolved IP address to user 10 (e.g., user application) through path 90. After obtaining the IP address of website 20, user 10 will be able to communicate with website 20, through a desired communication link 15.

In the above-discussed process, eight paths (70, 72, 74, 76, 78, 80, 82, and 90) have to be gone through in order to resolve a domain name. In addition, RNS 30, root 40, TLD server 50, and SLD server 60 may be located far apart from each other because of the random selection process conducted by RNS 30. Such configuration may cause serious transaction latency. Moreover, in the event of network partition or isolation, domain name resolution may fail because one or more of the above-discussed name servers may be unreachable.

Figure 2:
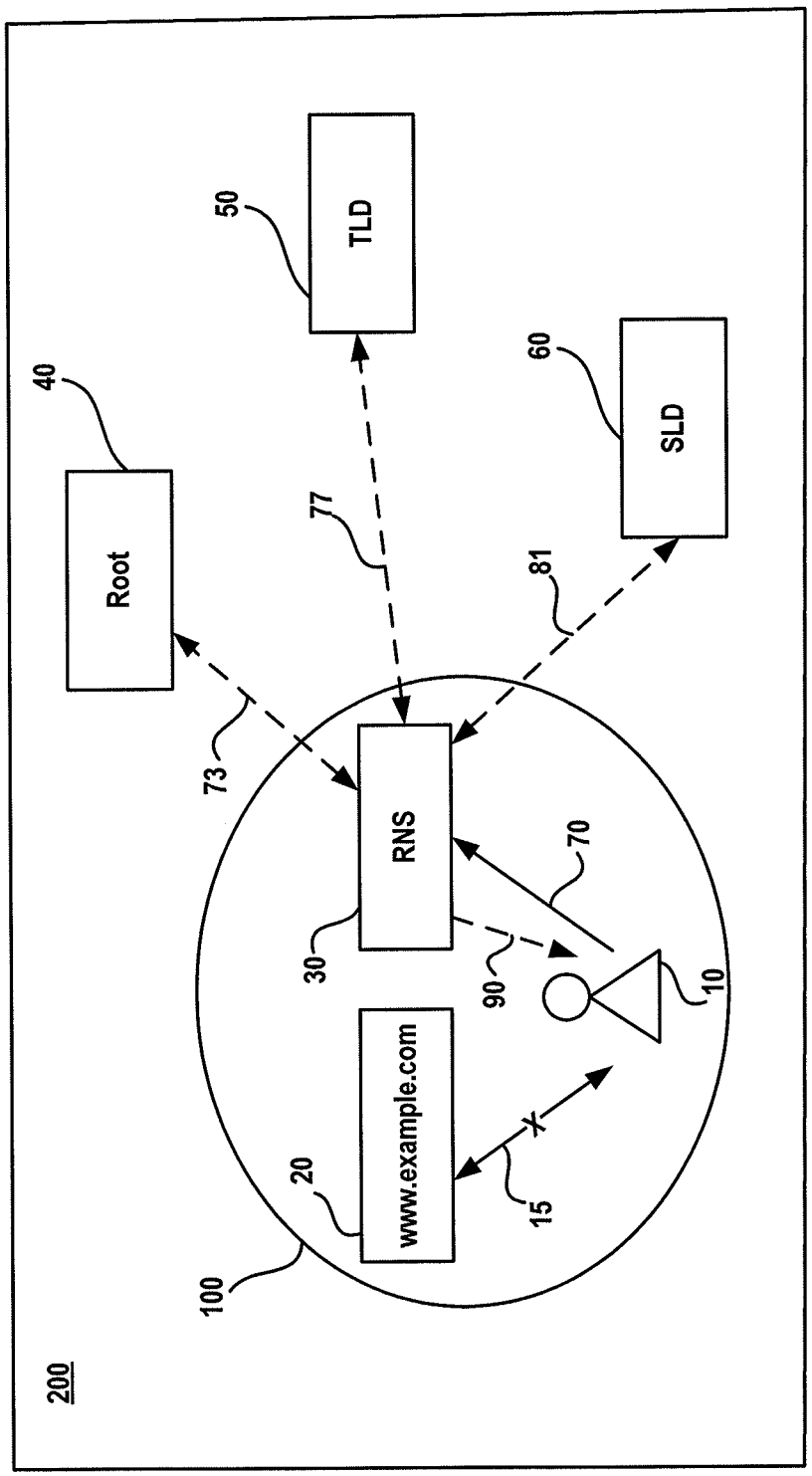
FIG. 2 is a schematic diagram illustrating an exemplary partitioned network consistent with some disclosed embodiments.

FIG. 2 illustrates an exemplary partitioned network 100. In FIG. 2, a network 100 having a confined network boundary is originally in the global Internet 200. For example, network 100 may be a national/regional network in a geographical national/regional boundary, a corporate network behind a corporate firewall, a network provided by an ISP, etc. In any event, when network 100 is temporarily or permanently partitioned or isolated from the global Internet 200, domain name resolution may fail even if user 10 only intends to connect to a website 20 located within the boundary of network 100. This is because one or more of root 40, TLD server 50, and SLD 60 may be located outside network 100. Without establishing proper information path(s) 73, 77, and/or 81 to and from these outside name servers, RNS cannot return the IP address of website 20 to user 10 (e.g., resolution failure is returned through path 90), and user 10 cannot connect to website 20 through communication link 15, even if website 20 may be itself located within the boundary of network 100.

Figure 3:
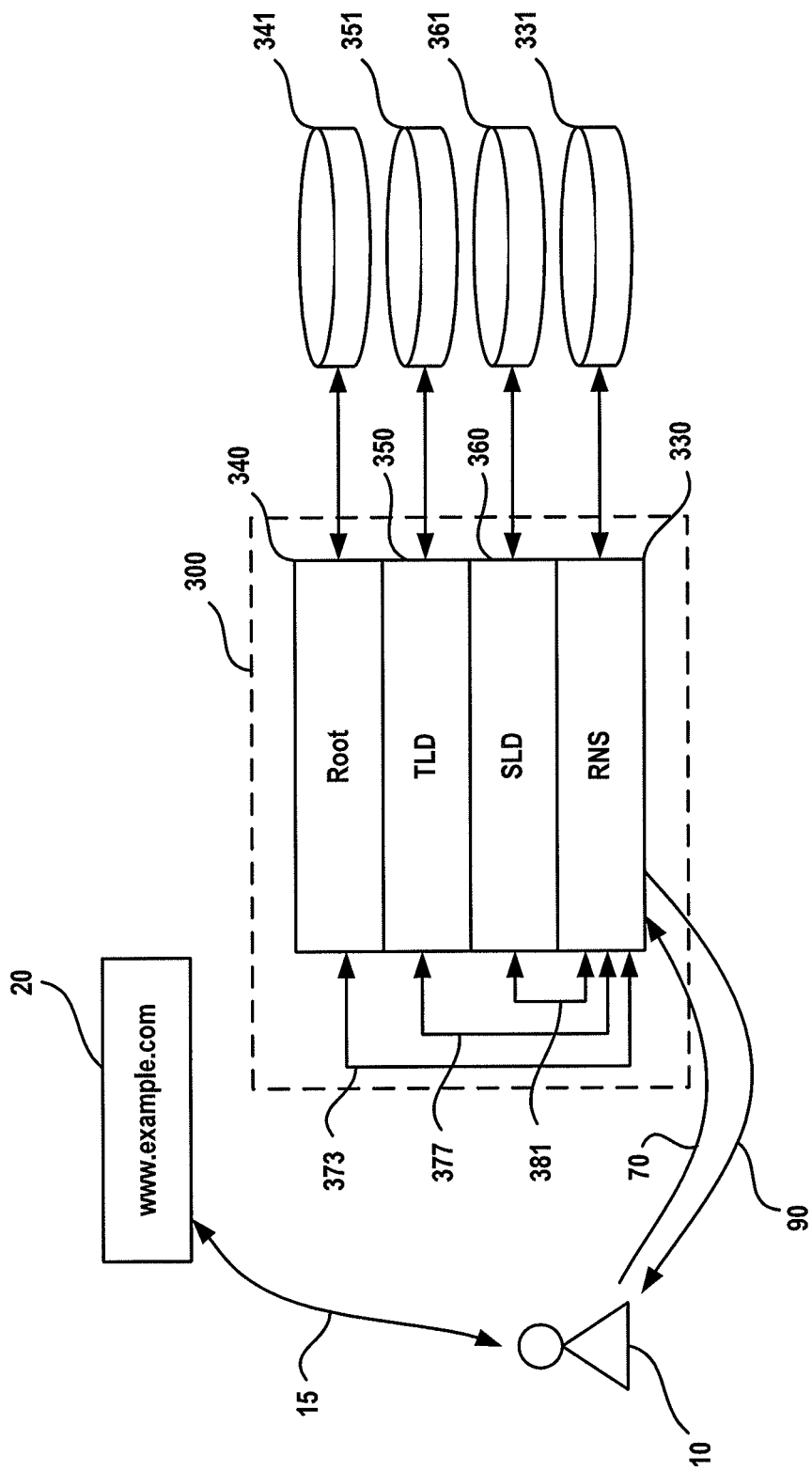
FIG. 3 is a schematic diagram illustrating an exemplary DNS package consistent with some disclosed embodiments.

FIG. 3 illustrates an exemplary DNS package 300 consistent with some disclosed embodiments. As shown in FIG. 3, DNS package 300 integrates one or more name servers in different DNS hierarchy levels. In one embodiment, DNS package 300 comprises one or more built-in root name servers 340, one or more built-in TLD name servers 350, one or more built-in SLD name servers 360, and a RNS 330. It is noted that other embodiments may integrate fewer or more name servers, name servers of different types, or name servers of different levels in the DNS hierarchy. In DNS package 300, RNS 330 may be configured to implement a strong affinity for the built-in root server(s) and TLD server(s). For example, in the event of network partition, RNS 330 may be configured to query only the built-in root server(s) during domain name resolution. The built-in root server(s) may also be configured to provide network address(es) corresponding to one or more built-in TLD servers in response to a domain name resolution query sent by the RNS. Similarly, TLD server(s) may be configured to provide network address(es) corresponding to one or more built-in SLD servers during domain name resolution process. In this way, the entire domain name resolution process can be completed within a network in which the DNS package is deployed, without requiring the RNS to consult name servers outside the network to resolve a domain name.

Take FIG. 3, for example, in which user 10 intends to connect to website 20, and sends a domain name resolution query to RNS 330 of DNS package 300. After receiving the query, RNS 330 may send the query directly to built-in root 340, without conducting a random selection process. This can be achieved by, for example, hard coding root server selection policy into RNS 330 or implementing a policy that prefers built-in root 340 to all other available root servers. The query can be sent to built-in root 340 through a communication channel 373. Built-in root 340, in turn, returns an address of a TLD server to RNS 330, through communication channel 373. In this process, built-in root 340 may be configured to return the address corresponding to one of the built-in TLD servers in the DNS package, instead of a remote TLD server located outside the network boundary. After receiving the TLD server's address, RNS 330 may send the query to a built-in TLD server 350 having the returned address, through a communication channel 377. Similar to built-in root 340, TLD server 350 may be configured to return an address corresponding to one of the built-in SLD servers in response to the query, through communication channel 377. RNS then sends the query to an SLD server 360 having the returned address through a communication channel 381. Finally, SLD server 360 locates the address corresponding to the queried domain name and returns the address to RNS 330, through communication channel 381. RNS 330 may then send the address to user 10 in order to establish communication link 15 between user 10 and website 20. In the above process, communication channels 373, 377, and 381 may be implemented as internal data exchanges inside DNS package 300. Various performance and/or security enhancements may be implemented on these channels.

Each component of DNS package 300 may have a corresponding database. For example, FIG. 3 illustrates a root domain database 341, a TLD database 351, a SLD database 361, and a RNS database 331. Traditionally, these databases are physically distant from each other, due to the distributed manner of the DNS system, causing large transaction latency and vulnerability to network partition. In one embodiment of the present application, two of more of these databases may be brought closer to each other. For example, databases 341, 351, 361, and 371 may be implemented in physical proximity of DNS package 300. In another embodiment, one or more of these databases may be integrated into DNS package 300. For example, DNS package 300 may include built-in root 340 and its associated database 341. Other databases can be integrated in a similar manner. As a result, DNS package 300 may provide considerable performance gains by removing the propagation delay caused by the typical 8-packet resolution exchanges for uncached content. Moreover, DNS package 300 may also enhance security of the network by removing open surface between different layers of DNS hierarchy, which attracts most attacks or spoofing.

Figure 4:
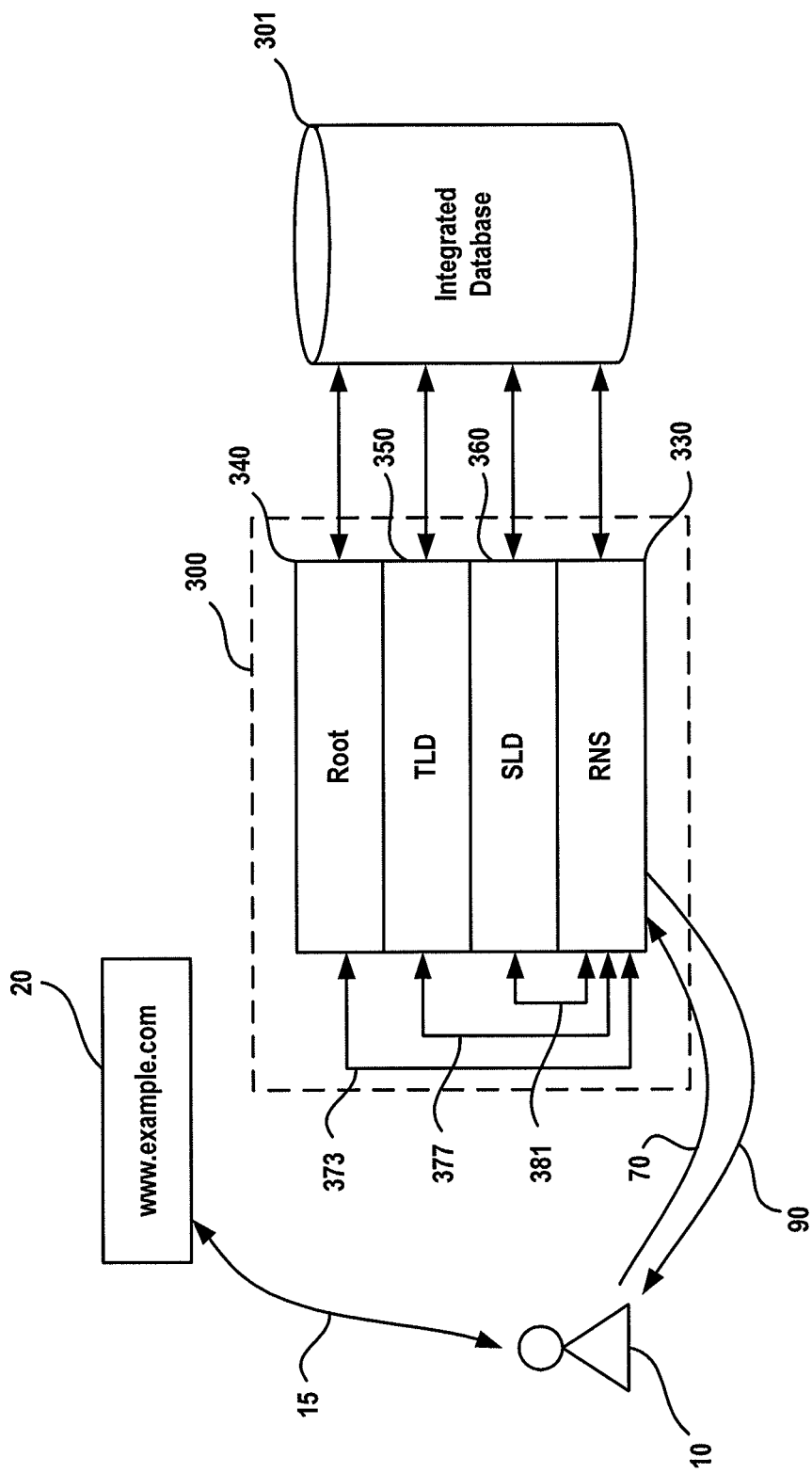
FIG. 4 is a schematic diagram illustrating another exemplary DNS package consistent with some disclosed embodiments.

FIG. 4 illustrates another embodiment of DNS package 300. Compared to FIG. 3, the embodiment shown in FIG. 4 utilizes an integrated database 301, which integrates databases 341, 351, 361, and 331 in FIG. 3. Integrated database 301 may further enhance the performance of domain name resolution. For example, related records in different levels may be internally linked or referenced in database 301. In this way, domain name resolution may be accelerated according to cross-layer information in database 301.

Figure 5:
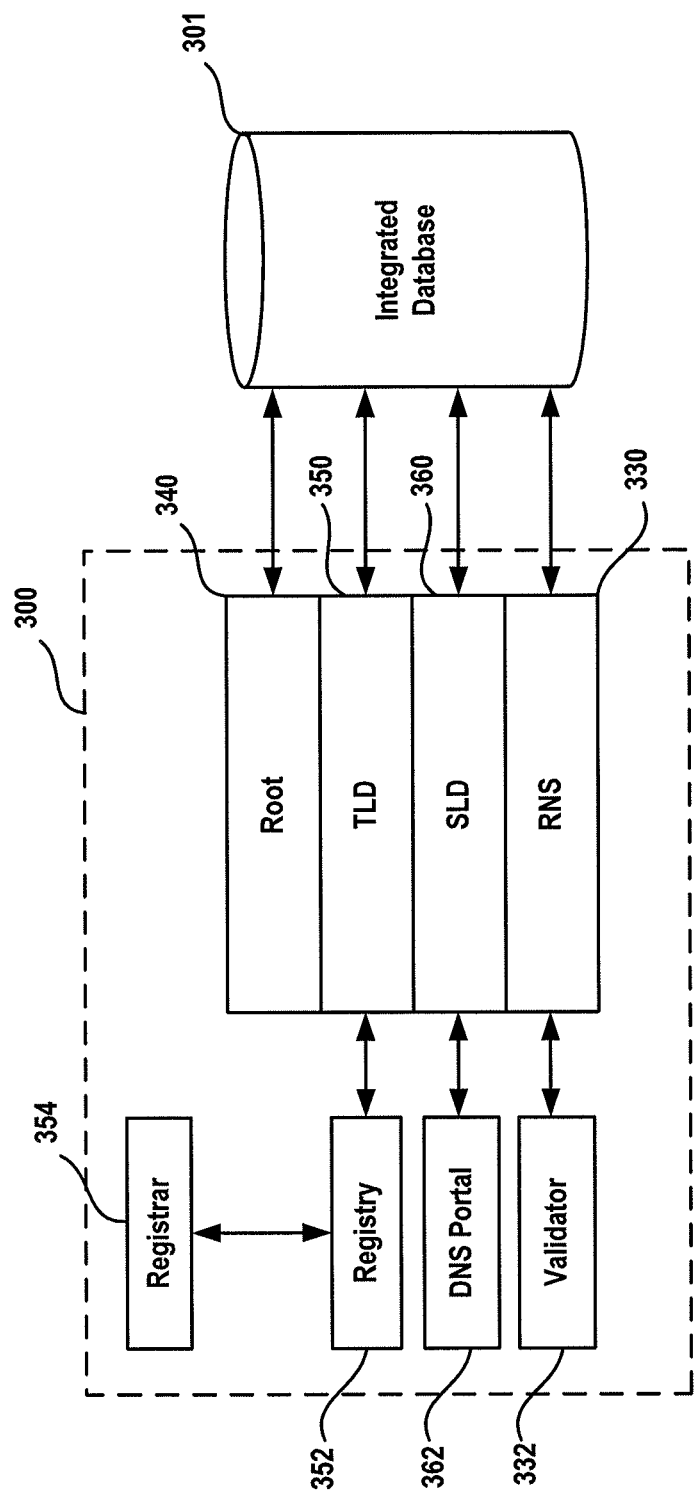
FIG. 5 is a schematic diagram illustrating a third exemplary DNS package consistent with some disclosed embodiments.

FIG. 5 illustrates another embodiment of DNS package 300. In FIG. 5, DNS package 300 includes a registry operation module 352. Registry operation module (or "registry") 352 may be configured to manage one or more top level domains, such as TLD 350. TLD 350 may include traditional domains, such as .COM, .NET, .ORG, .EDU, and .GOV, as well as the newer .BIZ, .INFO, and .NAME TLDs. In addition to the traditional TLDs, TLD 350 may also include new generic TLDs ("gTLDs"), country code TLDs ("ccTLDs") (each one reserved for use by a particular country, such as, .CA, .CN, .TV, and .US, associated with Canada, China, Tuvalu, and the United States, respectively), internationalized country code TLDs ("IDN ccTLDs") (allowing the use of alternative character sets to accommodate foreign languages), and infrastructure TLDs.

Registry 352 may be configured to store a copy of TLD data corresponding to one of the managed TLDs on one or more built-in TLD name servers. For example, a mirror of .COM and/or .NET zone data may be stored locally in, for example, database 301. Alternatively or additionally, a subset of TLD data of the managed TLDs may be stored on the one or more built-in TLD name servers. The subset may include records of one or more name servers whose network addresses are within a boundary of the partitioned network. For example, database 301 may store records of TLD name servers whose addresses are within the network in which DNS package 300 is deployed. In case of network partition, only those TLD name servers who are inside the network boundary will be used to resolve queries.

DNS package 300 may also include a registrar 354. Registrar 354 may be configured to receive and process a domain name reservation request sent by a user or an entity (also known as a registrant, not shown), and provide tools and an interface to the user or the registrant to maintain operation of the reserved name. Registry 352 in turn receives and processes requests from registrar 354 and provides tools and an interface to registrar 352 to maintain operation of its customers' (users' or registrants') reserved names. Registry 352 makes available the mechanism to reserve and update domain name registrations through the Extensible Provisioning Protocol (EPP). Registrar 354 authorized by registry 352 has the ability to make reservations and check the state of domain names through the EPP. Registry 352 provides the EPP as a communications gateway to registrar 354 for such purposes.

DNS package 300 may also comprise a DNS portal 362. DNS portal ("portal") 362 may be configured to direct a query to one or more authority servers in TLD 350 or SLD 360. For example, portal 362 may block or redirect a query based on the domain name included in the query for security and/or authentication purposes.

In some embodiments, RNS 330 may be configured to block, redirect, wildcard, synthesize, or geo-locate an address associated with, the domain name resolution query. For example, RNS 330 may block a query in case the domain name to be resolved is a known "bad" site. In another example, RNS 330 may redirect a query to an authentication or authorization website, before resolving the query. RNS 330 may also geo-locate an address associated with the query for various purposes such as, determining the address is inside or outside the network boundary.

DNS package 300 may comprise a validator 332. Validator 332 may be configured to valid a response received by the RNS based on a Domain Name System Security Extensions ("DNSSEC") certificate. DNSSEC certificates are issued by trusted issuers and are updated periodically. When a network partition/fragmentation/isolation occurs, renewed DNSSEC certificates may not be able to reach authoritative servers inside the network. As a result, domain name resolution would fail even if all required name servers are inside the network and function properly. In order to prevent such resolution failure from happening, validator 332 and/or RNS 330 can be configured to temporarily disregard an expire DNSSEC certificate, or bypass DNSSEC certificate validation in the interim, in order to perform domain name resolution even when the DNSSEC certificate expires.

Figure 6:
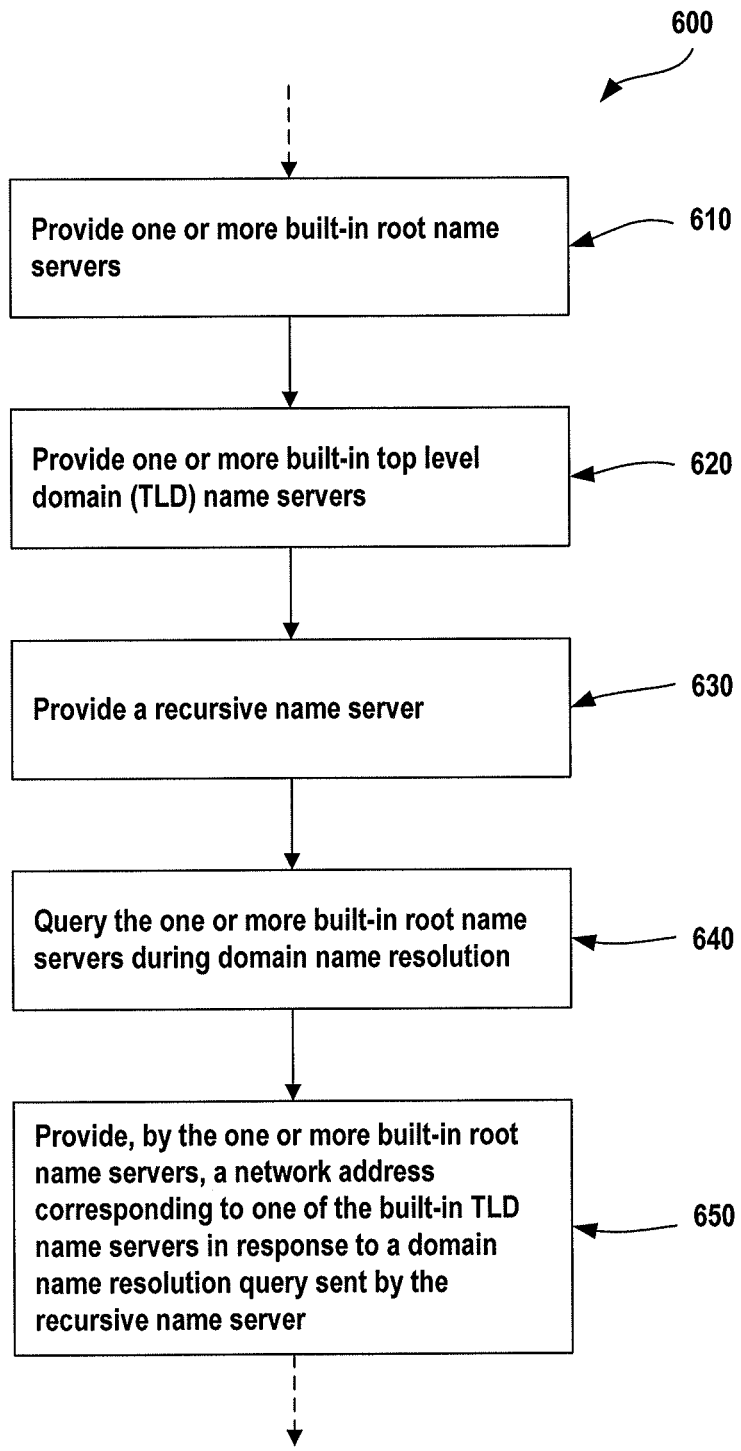
FIG. 6 a flow chart of an exemplary method for domain name resolution consistent with some disclosed embodiments.

FIG. 6 is a flow chart of an exemplary method for providing domain name resolution services in a partitioned network, in accordance with some disclosed embodiments. As shown in FIG. 6, method 600 may include a series of steps, some of them may be optional. As an example, in step 610, there may be provided one or more built-in root name servers (e.g., root 340). In step 620, there may be provided one or more built-in TLD name servers (e.g., TLD server 350). In step 630, there may be provided a recursive name server (e.g., RNS 330). In step 640, the RNS may query the one or more built-in root name servers during domain name resolution. In step 650, the one or more built-in root name servers may provide a network address corresponding to one of the built-in TLD name servers in response to a domain name resolution query sent by the recursive name server. The dashed arrows above step 610 and below step 650 indicate that the method 600 may be part of another method that includes more steps.

DNS package 300 may be implemented in a variety of ways. For example, DNS package 300 may be a specially-designed hardware device or system including software instructions encoded thereon to perform the disclosed domain name resolution methods. In another example, DNS package 300 may be a collection of virtual machines ("VMs") operating on generic computation equipment. In yet another example, DNS package 300 may be implemented as a "cloud" based service, such as Internet as a Service ("IAAS") or Software as a Service ("SAAS").

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A Domain Name System ("DNS") hardware package for providing domain name resolution services, comprising:
    one or more built-in DNS hierarchy databases configured for deployment within a network, wherein the one or more built-in DNS hierarchy databases are configured to store DNS records for one or more of a root domain, a top-level domain ("TLD"), or a second-level domain ("SLD"), wherein the one or more built-in DNS hierarchy databases comprise information for resolution of a domain name;
    a recursive name server configured for deployment within the network, wherein the recursive name server is configured to query the one or more built-in DNS hierarchy databases during the resolution of the domain name, wherein the recursive name server is configured to select the one or more built-in DNS hierarchy databases without querying an external domain name server and based on a selection policy that indicates a preference for the one or more built-in DNS hierarchy databases over the external domain name server, wherein the external domain name server is located outside of the network and comprises information for the resolution of the domain name; and
    a recursive name server database configured for deployment within the network, wherein the recursive name server database is configured to store DNS records for the recursive name server,
    wherein the selection policy that indicates a preference for the one or more built-in DNS hierarchy databases comprises: a preference for a built-in root server over other available root servers.

2. The DNS hardware package of claim 1, further comprising internally linking related DNS records in the top-level domain and the second-level domain in the one or more built-in DNS hierarchy databases.

3. The DNS hardware package of claim 1, wherein the recursive name server is configured for DNS caching, wherein the DNS caching comprises storing DNS query results for a period of time.

4. The DNS hardware package of claim 3, wherein the recursive name server is configured to determine the period of time based on a time-to-live value determined during configuration of the DNS records.

5. The DNS hardware package of claim 1, wherein the one or more built-in DNS hierarchy databases are configured to provide a network address corresponding to one of the DNS records for the top-level domain in response to a domain name resolution query from the recursive name server.

6. The DNS hardware package of claim 1, wherein the recursive name server is configured to block, redirect, wildcard, synthesize, or geo-locate an address associated with a domain name resolution request.

7. The DNS hardware package of claim 1, wherein the recursive name server is configured to disregard an expired DNSSEC certificate.

8. The DNS hardware package of claim 1, wherein the recursive name server is configured to bypass DNSSEC certificate validation.

9. The DNS hardware package of claim 1, wherein a response received by the recursive name server is validated based on a Domain Name System Security Extensions ("DNSSEC") certificate, wherein the recursive name server is configured to perform domain name resolution even when the DNSSEC certificate expires.

10. The DNS hardware package of claim 1, further comprising a registry server configured to store a copy of at least a portion of top level domain data corresponding to a managed top level domain.

11. A method for providing domain name resolution services, comprising:
    storing DNS records for one or more of a root domain, a top-level domain ("TLD"), or a second-level domain ("SLD"), the DNS records being stored with one or more built-in DNS hierarchy databases configured for deployment within a network, wherein the one or more built-in DNS hierarchy databases comprise information for resolution of a domain name;
    querying, using a recursive name server configured for deployment within the network, the one or more built-in DNS hierarchy databases during the resolution of the domain name, the recursive name server selecting the one or more built-in DNS hierarchy databases without querying an external domain name server and based on a selection policy that indicates a preference for the one or more built-in DNS hierarchy databases over the external domain name server, wherein the external domain name server is located outside of the network and comprises information for the resolution of the domain name; and
    storing, using a recursive name server database configured for deployment within the network, DNS records for the recursive name server,
    wherein the selection policy that indicates a preference for the one or more built-in DNS hierarchy databases comprises: a preference for a built-in root server over other available root servers.

12. The method of claim 11, further comprising internally linking related DNS records in the top-level domain and the second-level domain in the one or more built-in DNS hierarchy databases.

13. The method of claim 11, further comprising storing, using the recursive name server, DNS query results for a period of time.

14. The method of claim 13, further comprising determining, using the recursive name server, the period of time based on a time-to-live value determined during configuration of the DNS records.

15. The method of claim 11, further comprising providing, using the one or more built-in DNS hierarchy databases, a network address corresponding to one of the DNS records for the top-level domain in response to a domain name resolution query from the recursive name server.

16. The method of claim 11, further comprising blocking, redirecting, synthesizing, or geo-locating, using the recursive name server, an address associated with a domain name resolution request.

17. The method of claim 11, further comprising disregarding, using the recursive name server, an expired DNSSEC certificate.

18. The method of claim 11, further comprising bypassing, using the recursive name server, DNSSEC certificate validation.

19. The method of claim 11, further comprising validating a response received by the recursive name server based on a Domain Name System Security Extensions ("DNSSEC") certificate, and performing, using the recursive name server, domain name resolution when the DNSSEC certificate expires.

20. A non-transitory computer-readable medium for providing domain name resolution services comprising a plurality of instructions that, in response to execution by a processor, cause the processor to perform operations comprising:
    storing DNS records for one or more of a root domain, a top-level domain ("TLD"), or a second-level domain ("SLD"), the DNS records being stored with one or more built-in DNS hierarchy databases configured for deployment within a network, wherein the one or more built-in DNS hierarchy databases comprise information for resolution of a domain name;
    querying, using a recursive name server configured for deployment within the network, the one or more built-in DNS hierarchy databases during the resolution of the domain name, the recursive name server selecting the one or more built-in DNS hierarchy databases without querying an external domain name server and based on a selection policy that indicates a preference for the one or more built-in DNS hierarchy databases over the external domain name server, wherein the external domain name server is located outside of the network and comprises information for the resolution of the domain name; and
    storing, using a recursive name server database configured for deployment within the network, DNS records for the recursive name server,
    wherein the selection policy that indicates a preference for the one or more built-in DNS hierarchy databases comprises: a preference for a built-in root server over other available root servers.

* * * * *